United States Patent [19]

Lippmann et al.

[11] Patent Number: 4,781,435

[45] Date of Patent: Nov. 1, 1988

[54] METHOD FOR THE STEREOSCOPIC REPRESENTATION OF IMAGE SCENES WITH RELATIVE MOVEMENT BETWEEN IMAGING SENSOR AND RECORDED SCENE

[75] Inventors: K. Reiner Lippmann; K. Heinrich W. Dörgeloh, both of Braunschweig, Fed. Rep. of Germany

[73] Assignee: Deutsche Forschungs- und Versuchsanstalt für Luft- und Raumfahrt e.V., Cologne, Fed. Rep. of Germany

[21] Appl. No.: 909,502

[22] Filed: Sep. 19, 1986

[30] Foreign Application Priority Data

Sep. 19, 1985 [DE] Fed. Rep. of Germany ....... 3533379

[51] Int. Cl.$^4$ ..................... G02B 27/22; G01C 11/12
[52] U.S. Cl. ......................................... 350/130; 356/2
[58] Field of Search ..................... 350/130, 131; 356/2

[56] References Cited

U.S. PATENT DOCUMENTS 4,496,972  1/1985  Lippmann et al. ................. 358/105

FOREIGN PATENT DOCUMENTS 3018329  11/1981  Fed. Rep. of Germany .
3144050   5/1983  Fed. Rep. of Germany .

OTHER PUBLICATIONS

"Erfassung und Maschinelle Verarbeitung von Bilddaten—Grundlagen und Anwendungen", H. Kazmierczak, 1980, pp. 304–305.
"Luftbild und Luftbildinterpretation", S. Schneider, 1974, pp. 121–126.

Primary Examiner—John K. Corbin
Assistant Examiner—Scott J. Sugarman
Attorney, Agent, or Firm—Gottlieb, Rackman & Reisman

[57] ABSTRACT

Method for the binocular stereoscopic moving image representation of image scenes sensed with relative movement between a single monocular imaging sensor and a scene area, in particular aerial image scenes. The method uses left and right frames for said representation which are sensed at different times during said relative movement. For the continuous stereoscopic representation of almost the whole image the frames are each combined from parts of at least three consecutive sensed images of an image sequence overlapping in pairs. The parts of the at least three images are rectified under consideration of the geometric parameters of the actually sensed images such that the image scale for said parts is equal. The method is also applicable if sensed images are transmitted from said imaging sensor with a reduced frame rate and by imaging-adapted interpolation and/or extrapolation on the basis of two transmitted images. In each case intermediate images are reproduced and for the representation inserted between the transmitted images to produce said consecutive image sequence. Selected frame pairs can be displayed for a selected period of time as a still picture. For highlighting moving objects substantially identical image contents of the two frames used for representation are suppressed by subtraction of the data of the brightness values. Highlighting of moving objects can also be achieved by representing the two frames monocularly in alternation.

13 Claims, 3 Drawing Sheets

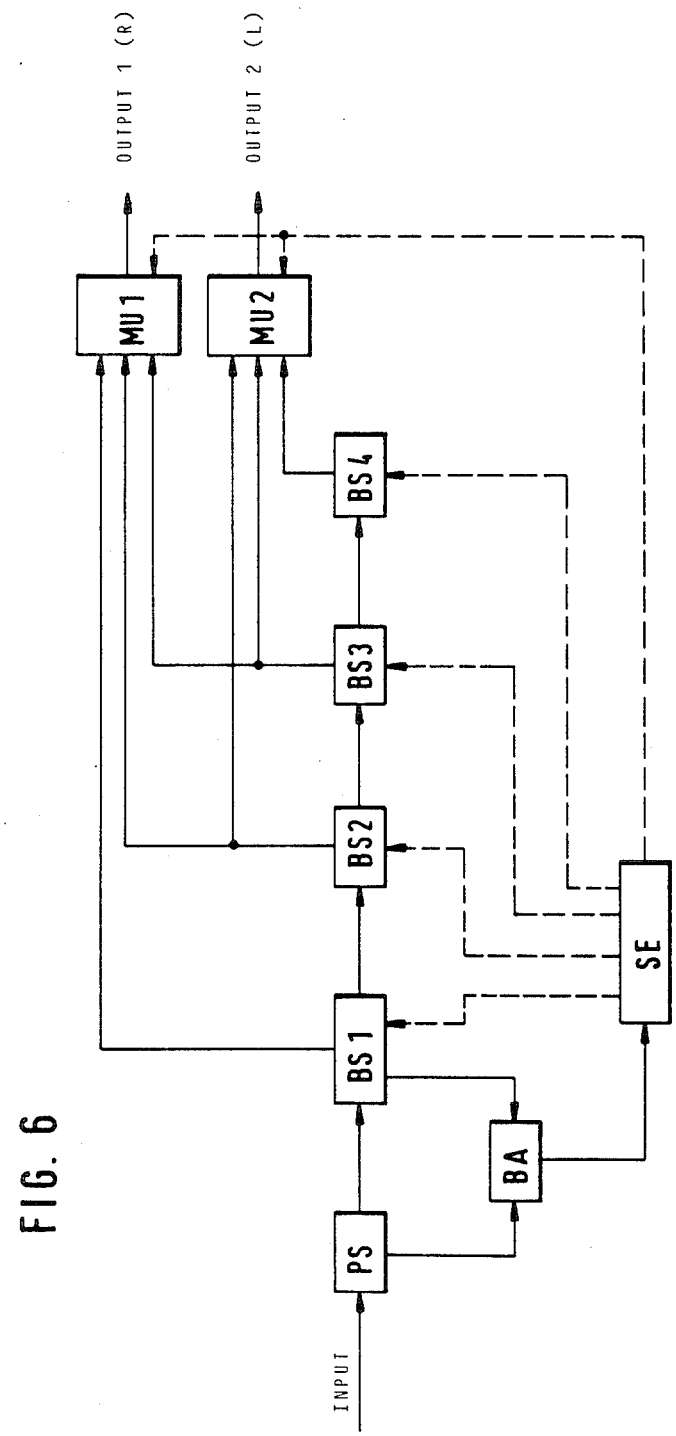

METHOD FOR THE STEREOSCOPIC REPRESENTATION OF IMAGE SCENES WITH RELATIVE MOVEMENT BETWEEN IMAGING SENSOR AND RECORDED SCENE

BACKGROUND OF THE INVENTION

The invention concerns a method for the stereoscopic representation of image scenes in which a single imaging sensor and a recorded scene move in relation to one another as in moving video aerial image scenes. In such scenes temporally displaced images generally correspond to different imaging locations which in the presence of overlapping scene areas represent the corresponding common image content from a different angle of view. For these areas a stereoscopic image representation is possible. In the case of continuous scenes such as video scenes a stereoscopic moving image representation in particular, corresponding to the imaging situation, can be achieved.

As the overlapping area of two images with constant angles of orientation of the imaging sensor only extends over a part of the image field, the image content cannot be reproduced in the whole image field stereoscopically. The stereoscopically displayable part of the image field decreases with an increasing time interval between the imaging of each of the two frames or fields of the stereo image, corresponding to an increasing distance between the imaging locations. A sufficiently large distance between the imaging locations (stereograph base), which in the case of aerial image scenes can be in the order of a few tens to a few hundreds of metres, is significant, however, for the achievable vertical resolution. On the other hand, it is desirable for image evaluation to be able to view stereoscopically a sufficiently large part of the image field.

SUMMARY OF THE INVENTION

It is an object of the invention to achieve a method which, in the case of scenes which move continuously in relation to the imaging sensor, such as video aerial image scenes, permits a continuous stereoscopic moving image representation and thereby in each image shown almost represents the whole image field stereoscopically.

A further object of the invention is to achieve a method for the binocular stereoscopic moving image representation of image scenes sensed with relative movement between a single monocular imaging sensor and a scene area, said method using left and right frames for said representation which are sensed at different times during said relative movement and including for the continuous stereoscopic representation of almost the whole image the steps that said frames are each combined from parts of at least three consecutive sensed images of an image sequence, said at least three images overlapping in pairs, and that at least said parts are rectified under consideration of the geometric parameters of said at least three consecutive sensed images such that the image scale for said parts is equal.

Further features of the invention are described with reference to the drawings.

The method is not restricted to translational image displacement and substantially vertical orientation of the imaging sensor.

The advantages achievable with the invention further consist therein that a more reliable evaluation of the image content can be reached and that with less viewer fatigue and faster adaption to the spatial image impression.

DESCRIPTION OF THE DRAWINGS

The present invention will be more readily appreciated by reference to the following detailed description when read in the light of the accompanying drawing in which:

FIG. 6 shows a block diagram of a device for carrying out the method.

DESCRIPTION OF THE PREFERRED EMBODIMENTS

Figure 1:
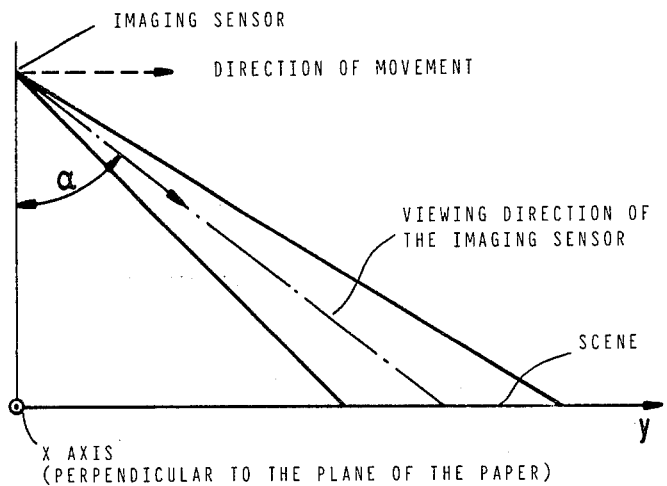
FIG. 1 shows the principle of an imaging situation with an oblique view in forward direction.

FIG. 1 shows an imaging situation in which a single monocular imaging sensor (e.g. video camera) views the scene in the object plane under oblique viewing conditions. In the case of imaging from an airplane or space vehicle the angle $\alpha$ is preferably between obliquely forward as shown and obliquely backward. In principle, all angles of orientation of the sensor (rotation through the transverse, vertical and/or longitudinal axis) can be varied.

Figure 2:
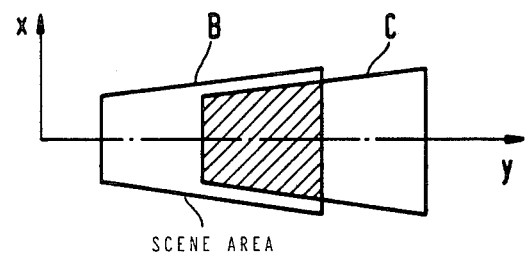
FIG. 2 shows a top view of two consecutive scene areas for the imaging situation according to FIG. 1.

The sensed scene area is shown in FIG. 2 for two consecutive imaging locations, which in the example correspond to two consecutive imaging instances or times (sensed areas B and C). In the direction of movement (y direction) the width (x direction) of the sensed area increases so that on a rectangular image field of a representation device (e.g. a TV monitor) the scene area is represented with a varying scale. For the restricted hatched part in which the sensed two areas overlap and in which a picture content common to two imaging locations is present, a binocular stereoscopic image representation is possible as known in the art.

Figure 3:
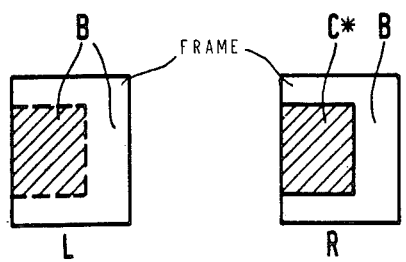
FIG. 3 shows the left and right frames (L or R) of the stereo image belonging to the two scene areas shown in FIG. 2.
Figure 4:
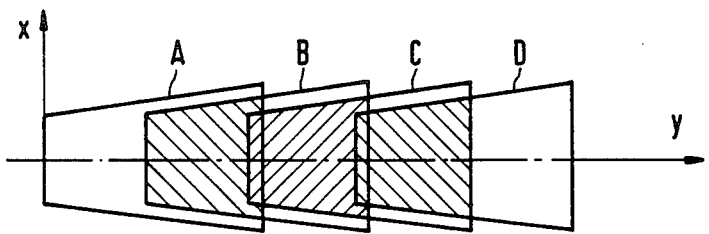
FIG. 4 shows four scene areas consecutively sensed for the imaging situation according to FIG. 1.

FIG. 3 shows, starting from the presentation of the scene area B, the corresponding areas in the represented left and right frames (L and R). In the example the frame belonging to the scene area B is presented to the observer to his left eye and on the right a frame which represents a part of the scene area C and a part of the scene area B. This frame is presented to the observer's right eye. The area corresponding to the hatched part from the scene area C is indicated by * in order to mark that for this part movement adaption, taking into account the imaging geometry, rectification is necessary. Only the hatched parts or areas of the image are represented stereoscopically.

For correct correspondence of the left and right image field the imaging sensor or the representing device, compared to traditional usage, is generally so oriented that the scene movement does not run vertically in the image, as frequently found in video aerial image scenes, for example, but horizontally, corresponding to the generally horizontal stereo viewing base (e.g. eyebase).

The direction of sensor movement in the example of the images according to FIG. 3 and FIG. 5a to FIG. 5c is from left to right.

By the method according to the invention the stereoscopic representation can be extended almost to the whole image field by using part of further images of a consecutive sequence of sensed images for representation of the frames L and R. If, for example, at the time at which the scene area B is represented in addition to the scene area C, the scene area of the preceding imaging location (scene area A) is used, two overlapping parts (differently hatched) now appear in the area B, which cover this area but for two narrow strips (white). The same applies to scene area C which is overlapping by one part from scene area B and one part from scene area D. Preferably, for two successive scene areas (A,B; B,C; C,D) in each case an overlap degree of at least 50% in the direction of movement should be available in order to achieve a continuous succession of the overlapping parts.

Figure 5A:
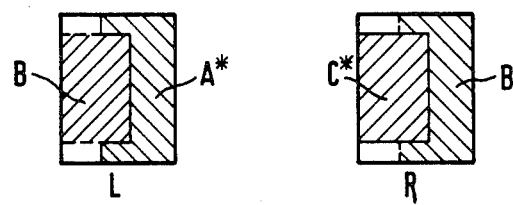
FIGS. 5a–c show the left and right frames (L or R) of the stereo image combined from parts to the scene areas shown in FIG. 4.
Figure 5B:
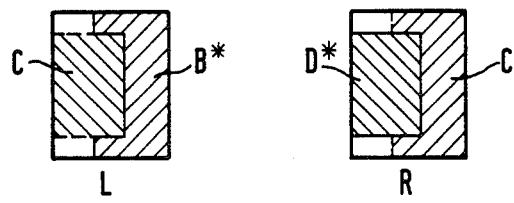

The combination of the left and right frames from the corresponding parts of the scene areas A, B and C or B, C and D is shown in FIG. 5a or FIG. 5b. FIG. 5a shows the situation at the time at which the image content of the scene area B is represented (representation time $t_B$), whilst FIG. 5b relates to the representation of the image content of the scene area C (representation time $t_C$). Indication by * identifies as before the necessary image adaptation taking into account well-known relations of imaging geometry, as for example described by H. Kazmierszak, "Erfassung und maschinelle Verarbeitung von Bilddaten", Springer-Verlag Wien, New York 1980, page 304. The stereoscopically represented, hatched area extends, in contrast to FIG. 3, substantially over the whole image field. The white area, i.e. the area which provides only monocular information, is separated from the part of its corresponding scene area by dashed lines. In FIG. 5a the white fields in both images therefore belong to the scene area B.

In each case the preceding and succeeding sensed images are adapted to the actually represented image. Thus, for example, at the representation time $t_B$ the images A and C are adapted to the image B (FIG. 5a) and at the representation time $t_C$ the images B and D are adapted to the image C (FIG. 5b). In the continuing image sequence this results in a corresponding continuing, dynamic image adaptation. As the alternative to the example shown in FIG. 5a and FIG. 5b with a sufficient image overlap the frames can also be composed in a different way.

Instead of the direct transition from one frame pair to the next frame pair for the individual imaging times, which for example correspond to the transition from FIG. 5a to FIG. 5b, a gradual transition is also possible, for example due to a reduced image rate transmission a relatively large time interval between the transmission of the sensed images (e.g. 1 second) exists and from the associated discontinuous movement representation by insertion of intermediate frames a continuous movement representation is to be regenerated. To provide stereoscopic image information within substantially the whole image field, parts from four images of the sensed sequence are required. These parts are dynamically adapted as described above for each intermediate frame pair to be inserted so that continuous movement representation occurs. The adaption of the intermediate frame pairs can be carried out in accordance with the method described in U.S. Pat. No. 4,496,972.

Figure 5C:
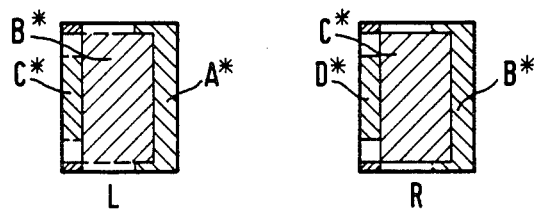

FIG. 5c shows an example of the combination of an intermediate frame which is to be inserted between the frame pairs according to FIGS. 5a and 5b. Besides the stereoscopically and the monocular reproduced areas (hatched and white fields respectively in FIG. 5c) smaller residual fields can, in dependence on the special sensing situation, occur which are allocated to none of the parts of the image areas and thus contain no image information. Those fields are shown dark in FIG. 5c. In general, by the insertion of reconstructed intermediate frame pairs, type, size and shape of the parts change in such a way that in the example shown the image composition according to FIG. 5a gradually changes to the image composition according to FIG. 5b.

FIG. 6 shows the block diagram of a proposal for an embodiment of a device by which in the case of a sensed image sequence with reduced image rate a continuous stereoscopic representation is achieved by inserting adapted intermediate frame pairs.

At the input image data of a new sensed image are read into a buffer store PS and subsequently transferred to a first image store BS1. At the same time each of the succeeding second to fourth image stores BS2-BS4 receive the content of the preceding one so that at the end of an initialization phase four succeeding sensed images are stored in the image stores BS1-BS4.

After each read-in of a new image into the buffer store PS the image adaption unit determines the parameters for the image adaption between this image and the preceding image in the image store BS1. These parameters are fed to the control unit SE which is also provided with the already predetermined adaptation parameters for the images in the image stores BS1-BS4.

The control unit SE then provides the information for the adapted read-out of the image stores BS1-BS4 and controls the composition of each of the two frames to be displayed from the corresponding partial regions of the sensed images stored in the image stores by means of the multiplexers MU1 and MU2.

The embodiment according to FIG. 6 can also be used for treating a sensed image sequence with non-reduced image rate. In this case the image store BS4 is not necessary since each frame pair is only composed of parts of three succeeding sensed images.

A further application of the method consists in its use for a large-area, i.e. substantially effective over the whole image area, detection and marking of moving objects by comparison of the composed left and right frames in its overlap regions. This comparison can be carried out by subtracting the data of the brightness values of corresponding picture elements of the two frames from each other. It then substantially remains the representation of moving objects because the latter appear at different picture elements of the frame of which the data has been subtracted. Another possibility of highlighting such objects consists in presenting the two frames of the stereo image in change monocularly. In this case the display of a moving object changes to and fro appropriately between its two positions in the frames (flicker effect).

Different from the example shown in the drawing the sensor and the scene can also be arranged in another way depending on the special conditions. For example, the scene can also be situated above the sensor or as in the case of a conveyor belt, said belt can move relative to an imaging sensor arranged in a fixed position.

An adaption of selected regions of succeeding images instead of the adaption of the whole images is also possible. Thereby those regions can be selected in which objects appear in large format. Those objects can be moving vehicles. These objects can here also be sensed with a stationary sensor location whereby a stationary location may also be a helicopter in hover flight. In this case only the vehicles or other object are moving relative to the imaging sensor whereas the scene area is not moving relative to the sensor. Therefore only the vehicles are represented stereoscopically.

The moving image reproduction can be combined with the representation of still images, where e.g. also portions of the image field and/or portions of the image sequence alone can be presented as a still image. The image sequence can further be represented at the rate corresponding to the imaging rate, but also with slow or quick motion, as described in U.S. Pat. No. 4,496,972.

Brightness differences between images to be combined into frames, e.g. those differences due to illumination differences, can be adjusted by means of picture brightness correction, as described in U.S. Pat. No. 4,710,809.

The aquisition of images of spatially consecutive scene areas can differ from the direct time related image sequence as described above in the example. Images of spatially consecutive scene areas can also be obtained from several traverses of the scene, e.g. by an aircraft or space vehicle. In such a case appropriate additional storage means for the image information from previous traverses to be allocated are required.

Apart from visual viewing the stereoscopic presentation the data can also be used for many kinds of automated image processing.

Video information in the sense of the invention means both information from the visible spectral range as well as from other spectral ranges such as the infrared range.

What we claim as our invention and desire to secure by Letters Patent of the United States is:

1. Method for the stereoscopic moving image representation of image scenes, especially aerial scenes, sensed with relative movement between an imaging sensor and a sensed scene area, using for said representation respective sequences of two half-images sensed at consecutive imaging locations, said method including, for the continuous stereoscopic representation of almost the whole image area, the steps of combining each of the two-half images of the instantaneous stereoscopic image from parts of at least three respective consecutive sensed images of an image sequence which overlap each other in the direction of movement in pairs by at least 50%, with the locations of respective consecutive images in said two combined half-images being offset by one consecutive imaging location, and rectifying at least said parts of said at least three consecutive sensed images which are to be combined, under consideration of the geometric parameters of said at least three consecutive sensed images, such that the image scale for corresponding object points is equal.

2. Method according to claim 1, wherein said sensed images are transmitted from said imaging sensor with a reduced frame rate, and wherein by imaging-adapted interpolation or extrapolation or both interpolation and extrapolation, on the basis of two consecutive half-images combined from parts of at least three respective consecutive sensed images of an image sequence in each case, at least one intermediate half-image is reproduced for the representation and inserted between said combined half-images to produce said consecutive sequence of half-images.

3. Method according to claim 1 or 2, wherein said half-images are combined from parts of said at least three consecutive images on the basis of momentarily viewed scene regions in which momentarily to be viewed objects appear.

4. Method according to claim 1 or 2, wherein selected pairs of said half-images are displayed for a selected period of time as a still picture.

5. Method according to claim 1 or 2, wherein for highlighting moving objects substantially identical image contents of the two half-images used for representation are suppressed by subtraction of the data of the brightness values.

6. Method according to claims 1 or 2, wherein for highlighting moving objects the two half-images are represented monocularly in alternation.

7. Method according to claim 3, wherein selected pairs of said half-images are displayed for a selected period of time as a still picture.

8. Method according to claim 3, wherein for highlighting moving objects substantially identical image contents of the two half-images used for representation are suppressed by subtraction of the data of the brightness values.

9. Method according to claim 3, wherein for highlighting moving objects the two half-images are represented monocularly in alternation.

10. Method according to claim 4, wherein for highlighting moving objects substantially identical image contents of the two half-images used for representation are suppressed by subtraction of the data of the brightness values.

11. Method according to claim 4, wherein for highlighting moving objects the two half-images are represented monocularly in alternation.

12. Method according to claim 7, wherein for highlighting moving objects substantially identical image contents of the half-images used for representation are suppressed by subtraction of the data of the brightness values.

13. Method according to claim 7, wherein for highlighting moving objects the two half-images are represented monocularly in alternation.

* * * * *